United States Patent
Yu et al.

(10) Patent No.: US 6,945,226 B2
(45) Date of Patent: Sep. 20, 2005

(54) INTAKE MANIFOLD VALVE SYSTEM, METHOD, AND DIAGNOSTIC

(75) Inventors: Songping Yu, Troy, MI (US); Gene Andersen, Trenton, MI (US); Michael John Cullen, Northville, MI (US); Eric S. Levine, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 166 days.

(21) Appl. No.: 10/248,937

(22) Filed: Mar. 4, 2003

(65) Prior Publication Data

US 2004/0173183 A1 Sep. 9, 2004

(51) Int. Cl.[7] .............................. F02D 9/10; F02M 35/10
(52) U.S. Cl. .................. 123/399; 123/442; 123/188.14
(58) Field of Search ................................ 123/342, 442, 123/188.14, 585, 339.11, 339.13, 337, 361, 396, 399; 701/107, 110, 111, 112

(56) References Cited

U.S. PATENT DOCUMENTS

| | | | | |
|---|---|---|---|---|
| 4,940,031 A | * | 7/1990 | Mann | 123/337 |
| 4,962,737 A | * | 10/1990 | Brand et al. | 123/585 |
| 5,040,508 A | * | 8/1991 | Watanabe | 123/396 |
| 5,429,090 A | * | 7/1995 | Kotchi et al. | 123/396 |
| 5,666,919 A | * | 9/1997 | Ichinose et al. | 123/399 |
| 2002/0129646 A1 | | 9/2002 | Fromm et al. | |
| 2004/0002808 A1 | * | 1/2004 | Hashimoto et al. | 701/107 |

FOREIGN PATENT DOCUMENTS

| | | | | |
|---|---|---|---|---|
| DE | 4140353 A1 | * | 6/1992 | 123/396 |
| JP | 2001/107786 A | * | 4/2001 | 123/396 |

* cited by examiner

Primary Examiner—Willis R. Wolfe, Jr.
(74) Attorney, Agent, or Firm—Allan J. Lippa

(57) ABSTRACT

A valve control and diagnostic system uses physical stops to determine whether a connection between the valve motor and the valves has become degraded. The method can detect degradation in both the opening and closing direction, as well as in multi-valve systems, such as used on internal combustion engines.

34 Claims, 10 Drawing Sheets

INTAKE MANIFOLD VALVE SYSTEM, METHOD, AND DIAGNOSTIC

BACKGROUND OF INVENTION

1. Field of the Invention

The field of the invention relates generally to valves in an intake manifold of an internal combustion engine.

2. Background of the Invention

Various types of valves are used in the intake manifold of internal combustion engines for adjusting the intake manifold flow dynamics. One such example is a charge motion control valve (or CMCV), which adjusts the intake flow swirl or tumble, thereby changing combustion characteristics. Another example is a swirl control valve (SCV). Still other examples can be found.

In one application, these valves can be controlled via an electric motor with position feedback. This position, or angle, feedback value of the valve can then be used to diagnose degradation of the valve system. E.g., if actual position/angle does not follow the command, degradation can be detected.

However, such an approach may not detect degradation of the entire valve system. For example, the coupling, or linkage, between the motor and the valve may become disconnected, and such an approach may still indicate acceptable performance between the motor position is moving as commanded, even though the valve itself is not moving.

One approach considered to solve this problem was to use two Hall effect sensors, one for each shaft, to accomplish the determination of de-coupling between the motor and valve shaft.

However, the present inventors have recognized that such an approach adds significant cost to the vehicle.

SUMMARY OF INVENTION

The above disadvantages are overcome, in one example, by a system for an internal combustion engine, comprising: a drive device; a valve system coupled to said drive device; a stop coming into physical contact with said valve system when said valve system approaches at least one of open and closed; and a controller determining degradation of said valve system if a determined valve position is past a position of said stop.

By determining whether the valve position is past a stop position, it is possible to determine degradation without adding additional sensors. This results in cost savings with improved diagnostic ability.

BRIEF DESCRIPTION OF DRAWINGS

The advantages of the present invention will be more fully understood by reading example embodiments as described below in reference to the following Figures.

DETAILED DESCRIPTION

Figure 1:
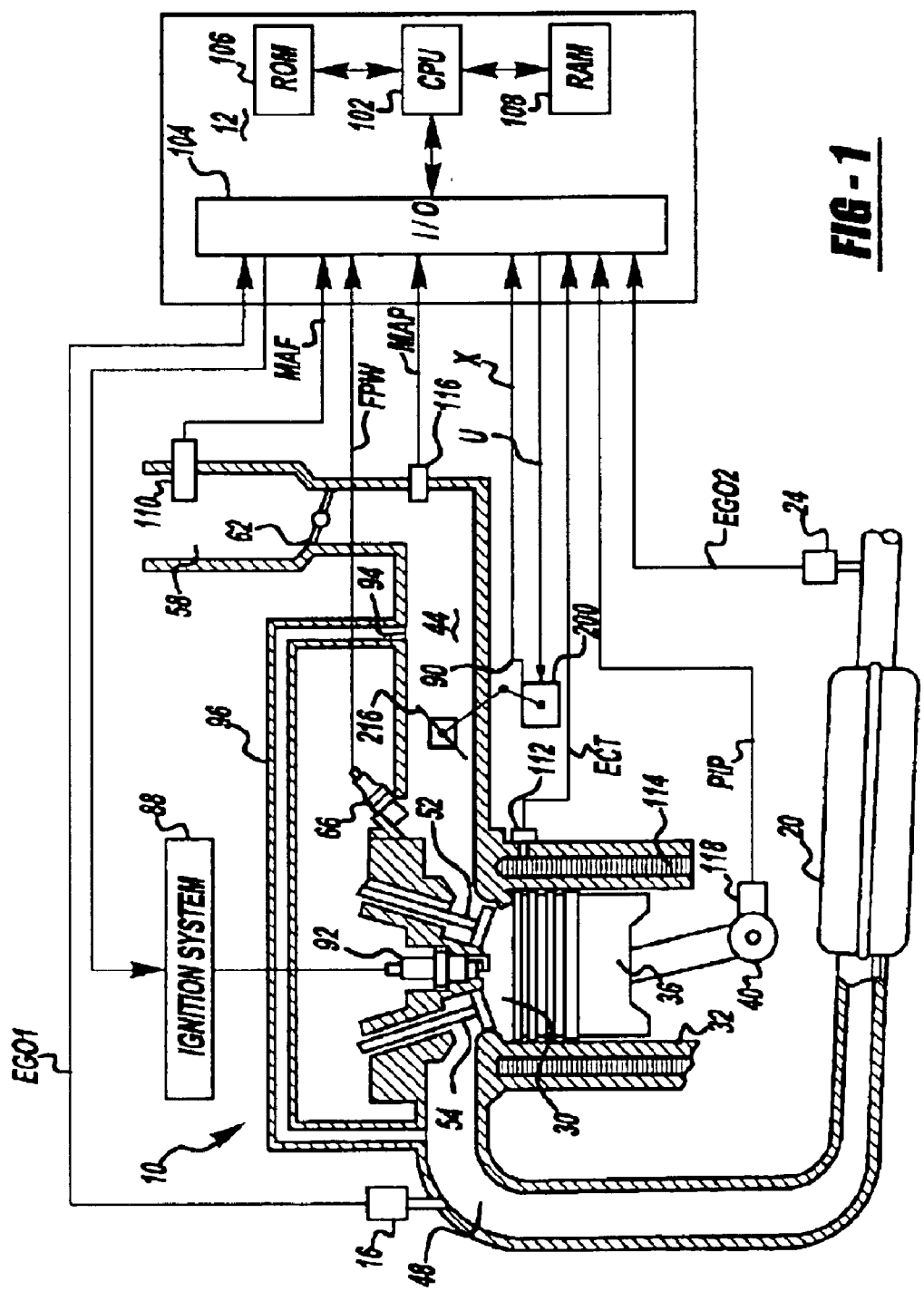
FIG. 1 is a block diagram of an engine for use with various embodiments of the present invention.

Internal combustion engine 10 comprising a plurality of cylinders, one cylinder of which is shown in FIG. 1, is controlled by electronic engine controller 12. In general terms, controller 12 controls engine air/fuel ratio in response to feedback derived from two-state exhaust gas oxygen sensor 16 and two-state exhaust gas oxygen sensor 24.

Continuing with FIG. 1, engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is shown communicating with throttle body 58 via throttle plate 62. Intake manifold 44 is also shown having fuel injector 66 coupled thereto for delivering liquid fuel in proportion to the pulse width of signal FPW from controller 12. Fuel is delivered to fuel injector 66 by a conventional fuel system (not shown) including a fuel tank, fuel pump, and fuel rail (not shown).

Conventional distributorless ignition system 88 provides ignition spark to combustion chamber 30 via spark plug 92 in response to controller 12. Two-state exhaust gas oxygen sensor 16 is shown coupled to exhaust manifold 48 upstream of catalytic converter 20. Two-state exhaust gas oxygen sensor 24 is shown coupled to exhaust manifold 48 downstream of catalytic converter 20. Sensor 16 provides signal EGO1 to controller 12 which converts signal EGO1 into two-state signal EGOS1. A high voltage state of signal EGOS1 indicates exhaust gases are rich of a reference air/fuel ratio and a low voltage state of converted signal EGO1 indicates exhaust gases are lean of the reference air/fuel ratio. Sensor 24 provides signal EGO2 to controller 12 which converts signal EGO2 into two-state signal EGOS2. A high voltage state of signal EGOS2 indicates exhaust gases are rich of a reference air/fuel ratio and a low voltage state of converted signal EGO1 indicates exhaust gases are lean of the reference air/fuel ratio.

Controller 12 is shown in FIG. 1 as a conventional microcomputer including: microprocessor unit 102, input/output ports 104, read only memory 106, random access memory 108, and a conventional data bus. Controller 12 is shown receiving various signals from sensors coupled to engine 10, in addition to those signals previously discussed, including: measurements of inducted mass air flow (MAF) from mass air flow sensor 110 coupled to throttle body 58; engine coolant temperature (ECT) from temperature sensor 112 coupled to cooling sleeve 114; a measurement of manifold pressure (MAP) from manifold pressure sensor 116 coupled to intake manifold 44; and a profile ignition pickup signal (PIP) from Hall effect sensor 118 coupled to crankshaft 40.

Note that FIG. 1 shows only a single intake valve 52 of a single cylinder. In actuality, engine 10 has multiple intake valves (e.g., two) and multiple cylinders (e.g. 8 in a v-type configuration, or 4 inline, or 6 in a v-type). Thus, FIG. 1 shows a single swirl control valve 216 coupled in an intake port of intake manifold 44. Valve 216 is shown coupled to motor 200 via linkage, which is described in more detail in FIGS. 2A and 2B, for example. Further, position/angle sensor 90 is shown sending a position (X) of valve 216 to controller 12. In an alternative embodiment, sensor 90 is coupled to motor 200 to provide a position/angle of motor 200 to controller 12. Further, controller 12 is shown sending a control signal (U) to motor 200. Control signal U can be a control voltage, a position request, an angle request, a PWM duty cycle, or a control current. In this example, swirl control valve 216 is shown coupled upstream of fuel injector 66 but downstream of exhaust gas recirculation inlet 94 of exhaust gas recirculation path 96. Stops for the swirl control valve system are not shown in FIG. 1, but are shown in more detail in FIGS. 2A and 2B, for example.

As will be described below, controller 12 controls position of the swirl control valves via position feedback from sensor 90.

Note also that the description in these figures refers to a swirl control valve. However, this low cost diagnostic and control system can be used for charge motion control valves (CMCV) or intake manifold runner control valves (IMRC) or swirl control valves (SCV).

As described in more detail below, these valve systems can change the flow pattern of air entering the cylinder of an internal combustion engine used in motor vehicles. One example of the present invention allows not only the angular position of the electric motor be monitored, but that the connection of the motor to the CMCV valves should to be monitored.

This is accomplished in a variety of different ways as described in detail below. One example solution is to use a combination of hardware and software. The hardware involves creating effective angular position stops on the linkage mechanism of each bank of a V engine. The stop on one bank would dominate in the open direction, the stop on the other bank would dominate in the closing direction. (in this way, a single motor/position can be used to perform the diagnostic). Degradation of the linkage from electric motor to its connection to the valve shaft would result in the respective stop being ineffective and the motor would be allowed to travel beyond the normal stop to a second level of stop. This over-travel, be it in the open or closed direction, would comprise an indication of a degraded linkage on one bank or the other.

Figure 2A:
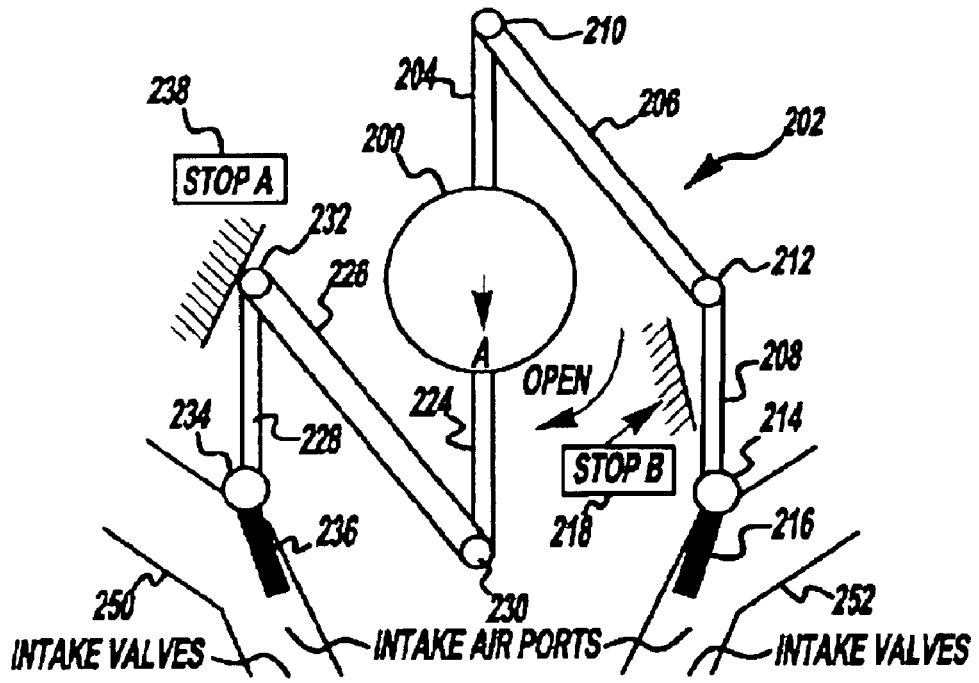
FIGS. 2A and 2B are schematic diagrams of an example embodiment of a swirl valve system.
Figure 2B:
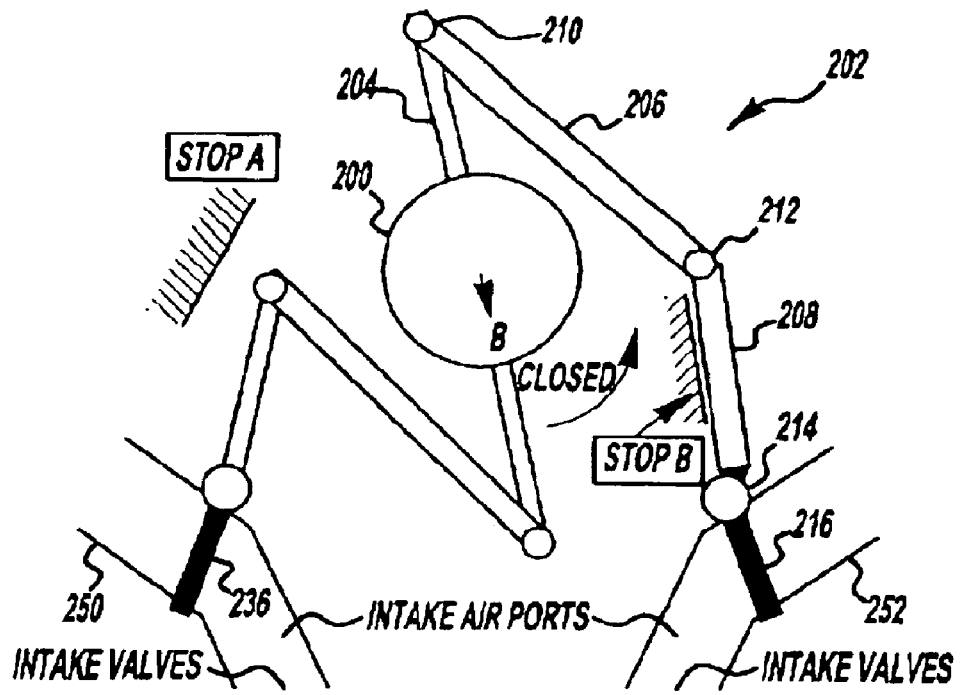

Referring now to FIGS. 2A and 2B, an example embodiment of the present invention applied for V type engines is shown. Note that this is just one example embodiment, and other example embodiments can be used as will be described below herein. In particular, a single mechanism can be used in the example embodiment for an in-line engine (I-type).

In general, FIG. 2A shows the charge motion control valves (216 and 238) in the full open position, while FIG. 2B shows the charge motion control valves in the fully closed position. Note that while the valves are stated to be either "fully open", or "fully closed", charge motion control valves 216 and 236 do not have their motion constrained by the opening and intake ports 250 and 252. Rather, as will be described below herein, the range of motion of valves 236 and 216 is limited by two physical stops (stop A and stop B).

Specifically, FIG. 2A shows charge motion control valves 216 and 236 in the full open position. As described above, valves 216 and 236 can move past the full open position. The range of motion of valves 236 and 216 is finally constrained by stop A (238), as now described. The range of motion in the opening direction of valves 216 and 236 is constrained by stop A, rather than the intake ports 250 and 252 to reduce engine noise and vibration. In other words, if the full open position had valves 236 and 216 abutting a stop in the intake ports, this could cause noise and vibration during engine operation while the valves were in the full open position. As such, the "full open position" is set to a position lower (smaller opening) than the position where the valves are stopped by stop A. In this way, reduced engine noise and vibration is obtained. Similarly, as will be described with regard to FIG. 2B, the valves 236 and 216 can move past the "fully closed position" but are finally stopped by stop B.

The valve assembly 202 includes motor 200. A first linkage 204 is coupled to motor 200. Linkage 204 is coupled to linkage 206 by rotatable joint 210. Linkage 206 is then coupled to linkage 208 via rotatable joints 212. Finally, linkage 208 is coupled to charge motion control valve 216 via rotatable joint 214. Similarly, links 224, 226, and 228 couple charge motion control valve 236 to motor 200 via joints 230, 232, and 234. These joints create four bar linkages so that as motor 200 rotates in the clockwise (opening) direction, valves 236 and 216 are opened. The opening of valves 236 and 216 is finally stopped by stop A (238). As described above, the system 202 does not stop rotation until the linkage is restrained by stop A. The "fully open position" is set to a value smaller than the position at which the system 202 is abutted against stop A. In other words, when the engine controller desires a full open position, the motor turns in the opening direction, but stops turning before linkages 234 or 226, or joint 232 is restrained by stop A.

Note that FIG. 2A shows an embodiment where the motor operates two charge motion control valves via two four bar linkages. In an alternate embodiment, a single four bar linkage could be used with motor 200 with valves 236 and 216 being rotated on a common shaft. In another alternate embodiment, the four bar linkage can be replaced by a single coupling device which translates the rotary motion of motor 200 into rotary motion of the valves 236 and 216.

As described above, during regular operation, the motor controls the valves 236 and 216 to the "full open position" without abutting stop A. However, to ensure that the linkages between motor 200 and intake and charge motion control valves 236 and 216 are functioning properly, the motor can move slightly past the fully open position and abut the linkages against stop A, while monitoring current end position as described below herein. (Note that in an alternative embodiment, electrical power could also be monitored.) In general terms, the motor 200 attempts to rotate past the known location of stop A. If, in the opening direction, the motor can move past stop A, without meeting resistance, the determination can be made that degradation of the linkage from motor 200 to valve 236 has occurred. Such determination can be made simply from the feedback position information of motor 200, with or without augmentation of the motor current information.

Note that in this example, charge motion control valves 216 and 236 are valve plates that can be made from either metal or plastic materials.

Referring now to FIG. 2B, the charge motion control valve system 202 is shown in the "fully closed position". Again, the "fully closed position" refers to a position as reached before the system 202 reaches a stop. In other words, the motor can rotate the linkage system, and thus valves 216 and 236, past the fully closed position to reach stop B (218). In this case, the motor 200 rotates in the counterclockwise direction to cause valves 216 and 236 to move in the closed direction. In this case, the linkage between 200 and valve 216 stops the system 202 motion by abutting stop B, during normal operation.

In the case where the linkage system between motor 200 and valves 236 and 216 has degraded, the motor is able to turn past the known location of stop B. In this way, it can be determined that degradation of the linkage between motor 200 and valve 216 has degraded as described herein below.

Note that the Stops described above can be physical components of the manifold, or of the cylinder head. Further, they can be a component that is coupled to the swirl control valve mechanism, such as a special plate, screw, or anything that stops the linkage or member from continuing its motion. For example, it could be just a surface of some part in intake manifold or port.

Note also that FIGS. 2A and 2B describe a member that is a mechanical 4 bar linkage to couple motor 200 to valves 216 or 236. In an alternative embodiment, there can be a direct connection between the drive device (such as electric motor 200, or a electric solenoid, etc.) and the valve such as, for example, a bolt, a weld joint, screws, a plastic joint, or various others. Further, as mentioned previously, there are various alternatives to the electric motor 200 such as, for example, a vacuum actuator, a stepper motor, a piezoelectric actuator, or a mechanical actuator controlled by the operator.

As shown by FIGS. 2A and 2B, it is possible to determine degradation in a first linkage when the motor is moving valves 216 and 236 in the opening direction, and to determine degradation in a second linkage when the motor 200 is moving valves 216 and 236 in the closing direction. Note that in FIGS. 2A and 2B, the intake ports 250 and 252 lead to the intake valves (52) of the internal combustion engine.

Figure 3:
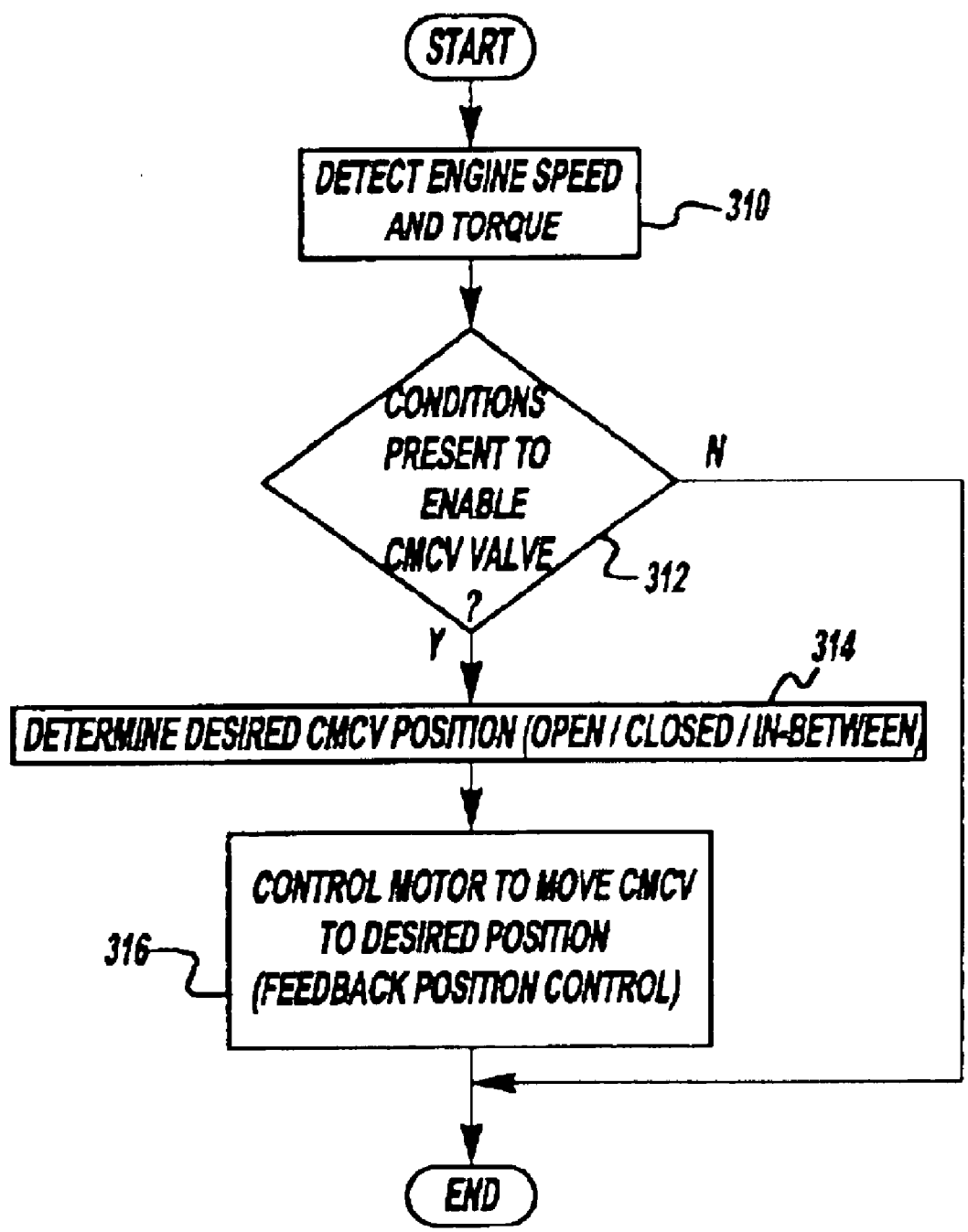
FIGS. 3–6 are high level flowcharts illustrating various embodiments of the present invention.

Referring now to FIG. 3, a routine for controlling charge motion control valve position during engine operating conditions is described. In general terms, the routine adjusts the desired charge motion control valve position (open/closed/in between) based on engine operation conditions including engine speed and engine torque. In alternative embodiments, valve operation is responsive to at least one of operator demand, a throttle cable, vehicle speed control operation, traction control operation, engine idle speed control operation, and operation of a valve adjusting airflow into a cylinder of a multi-cylinder internal combustion engine. The position of the valve is feedback controlled based on a measured position of the motor 200.

First, in step 310, the routine determines the current engine speed and engine torque. Then, in step 312, the routine determines whether to enable the charge motion control valves. In other words, in one embodiment, the charge motion control valves 216 and 236 are biased via a spring-loaded mechanism to a predetermined position (either open or closed). In other words, the valves are located in a default position not requiring any feedback control to maintain their present position. Thus, if the answer to step 312 is "no", the routine simply ends and no control action via motor 200 is taken since the valves should not be enabled. In an alternate embodiment, the default position is selected to be either open or closed. In this case, when the enabling of the charge motion control valves is not allowed based on the current operating conditions, the routine controls the charge motion control valves to the desired default position and the routine ends. In an alternative embodiment, the routine can determine throttle angle, or percent torque, or percent of peak torque, for use in scheduling/enabling the charge motion control valves.

Alternatively, when the answer to step 312 is "yes", the routine continues to step 314 and determines the desired charge motion control valve position (open/closed/in between). Typically, the desired charge motion control valve position is mapped as a function of speed and torque to be either open or closed. In an alternate embodiment, partially open positions are also selected based on engine speed and load. In yet another alternative embodiment, the trajectory of the charge motion control valve from the opened to closed (or from closed to open) position is controlled to obtain a predetermined trajectory transition.

From the desired position determined in step 314, the routine continues to step 316 and controls the motor to move the charge motion control valve to the desired position. In other words, in step 316, the routine uses feedback position control based on position of motor 200.

Figure 4:
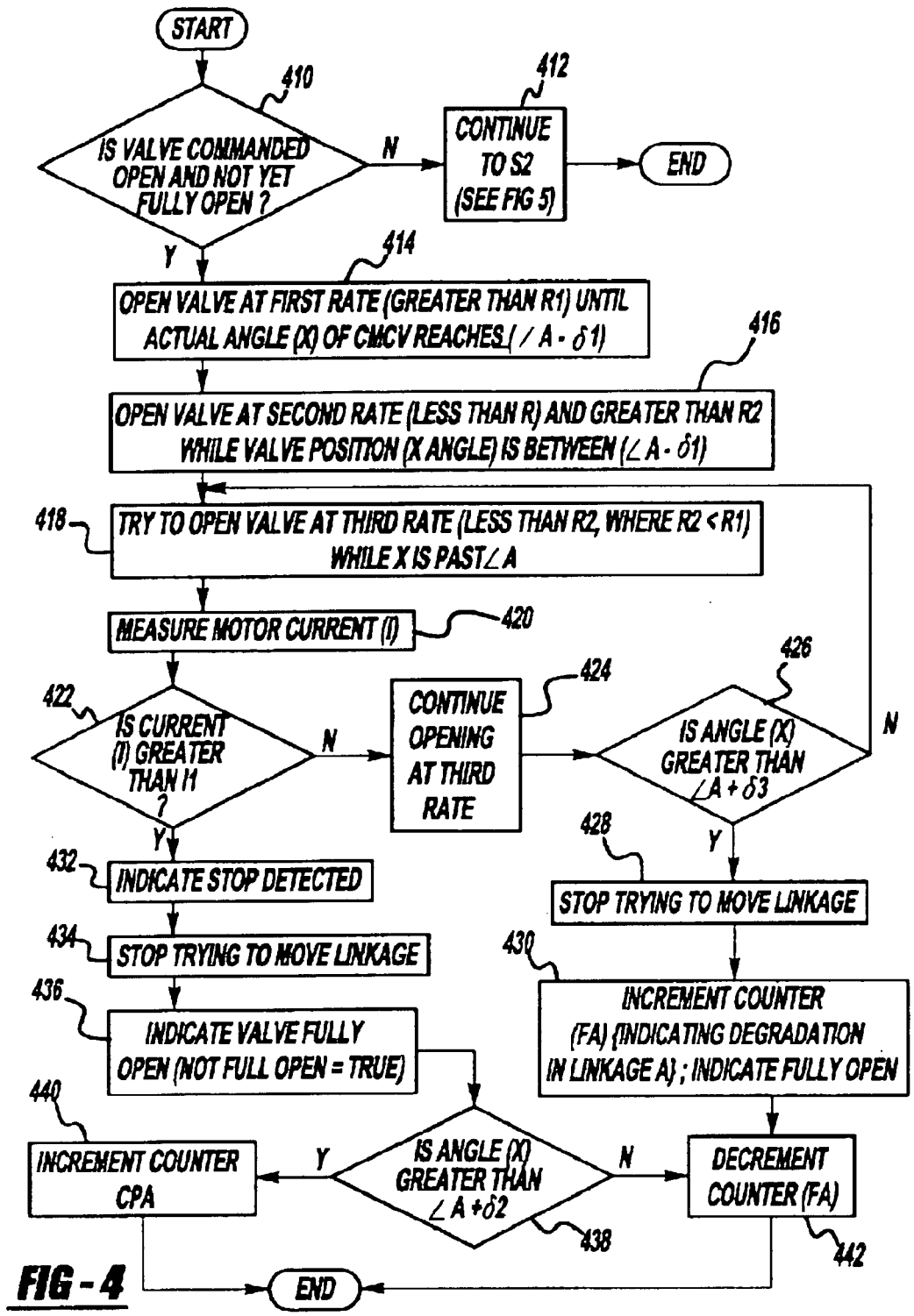

Referring now to FIG. 4, a routine is described for determining degradation in either the first or second linkage of system 202. Note that in the example routines of FIGS. 4 and 5, the routines determine degradation of a system as described in FIGS. 2A and 2B. However, this is simply one example diagnostic routine which can be modified to diagnose alternate valve and linkage systems as will be described. For example, in the case of an Inline engine (e.g., I4, I5, or I6), only a single valve actuator can be used.

First, in step 410, the routine determines whether the valve was commanded open and not yet fully opened. When the answer to step 410 is "no", the routine continues to step 412 where the routine continues to step S2 as described in FIG. 5 below. Alternatively, when the answer to step 410 is "yes", the routine continues to step 414.

In step 414, the routine opens valves 216 and 236 (or a single valve in the example of an I-4 engine) at a first rate R-1 (greater than a given rate R1) until the actual angle of the motor (X) reaches a predetermined angle (angle A–δ1). In other words, the routine opens the first valve at a rate of speed (termed R-1, which can be variable) greater than a predetermined value R1. E.g., during this period, the opening rate (R-1) is greater than R1. The valves are opened at this rate until the actual angle of the valves reaches a predetermined angle. In this example, the angle of the charge motion control valve 216 and 236 are determined from the angle X of the motor 200. In other words, the routine uses a predetermined mapped relationship between the motor angle and valve angle via the linkages. In an alternative embodiment, actual angle of the valves can be measured in lieu of the motor position/angle (X).

Then, in step 416, the routine opens the valves 216 and 236 at a second rate (R-2) which is less than rate R1 and greater than rate R2 while the valve position/angle (X) is between (angle A–δ1) and angle A. Then, in step 418, the routine tries to open the valve at a third rate (R-3), which is less than R2, (where R2 is less than R1) while the motor position (X) is past angle A. In other words, the routine attempts to rapidly move the charge motion control valves to the desired fully open position, and once the valves are near the stop A, the routine moves the charge motion control valves at a slower rate. To find the stop, the routine then moves the charge motion control valves at a third slower rate (R-3). Note that this is just one example embodiment, and if desired, a single rate, or a continuously variable rate can be used. Note that angle A refers to the motor angle at which the linkages should encounter and abut stop A. δ1 is a small margin angle. Values for δ1, R1, and R2 are determined based on mechanical design specifications and engine testing. Finally, note that instead of opening very slowly past stop A while monitoring current to detect that the opening is inhibited by a stop, the routine could also detect closing by observing that the angular position feedback is not changing (or changing less than a small tolerance) while energy is applied to the motor.

As described above with regard to FIG. 2A, once the motor has turned the valves to the fully open position, further opening of the valves should result in the linkage encountering stop A and thereby halting movement of the valve system 202. Thus, during normal operation in step 418, the linkages are abutting stop A and the motor 200 is unable to further open valves 216 and 236.

At this point, the routine measures the motor current (I) in step 420. During normal conditions, when the linkages are abutting stop A, motor current should increase beyond a threshold level (I1) as the motor is unable to rotate past the stop. In other words, when the linkages between the motor 200 and valves 216 and 236 is intact, further movement is restricted by stop A, and as the routine attempts to move the motor position in the clockwise direction, current gradually increases. In step 422, the routine determines whether the current is greater than the threshold level I1. When the answer to step 422 is "no", the routine continues opening the valves at the third rate in step 424. Then, in step 426, the routine determines whether the angle (X) is greater than angle A plus lower case delta-3. Lower case delta 3 is a pre-selected valve indicating a margin above which angle or movement indicates the linkage between motor 200 and valve 236 is degraded. If the answer to step 426 is "no", the routine returns to step 418. When the answer to step 426 is "yes", the routine continues to step 428.

In step 428, the routine stops trying to move the motor and the linkage. Then, in step 430, the routine increments a degradation counter (FA) indicating the linkage from motor 200 to valve 236 is degraded. Further, the routine indicates that the charge motion control valves are in the fully open position. From step 430, the routine proceeds to the end.

When the answer to step 422 is "yes", indicating that motor current has increased and the system is at the stop, the routine indicates in step 432, that the stop has been detected. Then, in step 434, the routine stops trying to move the motor and linkage. Then, in step 436, the routine indicates that the valve is set fully open (it sets parameter full_open equal TRUE).

Then, in step 438, the routine determines whether the angle X is greater than angle A plus δ2. δ2 is a second angle margin indicating that the linkage has moved past the position of stop A and therefore the linkage between motor 200 and valve 236 is degraded.

However, to prevent false readings, the routine uses a counter (FA). When the answer to step 438 is "yes", the routine increments the counter in step 440. Alternatively, when the answer to step 438 is "no", the routine decrements the counter in step 442.

In this way, it is possible to determine degradation of the linkage between motor 200 and valve 236. In an alternative embodiment which does not use measured motor current (I), the routine can determine degradation in the linkage between motor 200 and valve 234 based on simply a counter counting the number of loops where the angle of motor 200 is greater than angle A plus δ2.

Note that in this example, a linkage is used between motor 200 and valve 236. In an alternative embodiment, motor 200 can be directly coupled to valve 236 without a four-bar linkage. In other words, the linkage between valve 236 and motor 200 can be simply a bolt, screws, welding, or another such connection.

Note that δ1 can also be set as the proximity to an expected hard stop wherein the motor is slowed down to prevent motor damage, δ2 can be set to the angular travel beyond the expected hard stop which statistically is beyond the hardware stackup so that it indicates that the linkage from the motor to the valve shaft is broken/disconnected, and δ3 is set to a further angle, which could be in the form of a second hardstop, or a stop based on the motors angular reading, beyond which further travel is not allowed. This is a measure so that even if the hard stop is never reached the opening or closing process will cease. With this logic either a second hardstop, or a software stop based on the motor angular output can be utilized to the same diagnostic effect.

Figure 5:
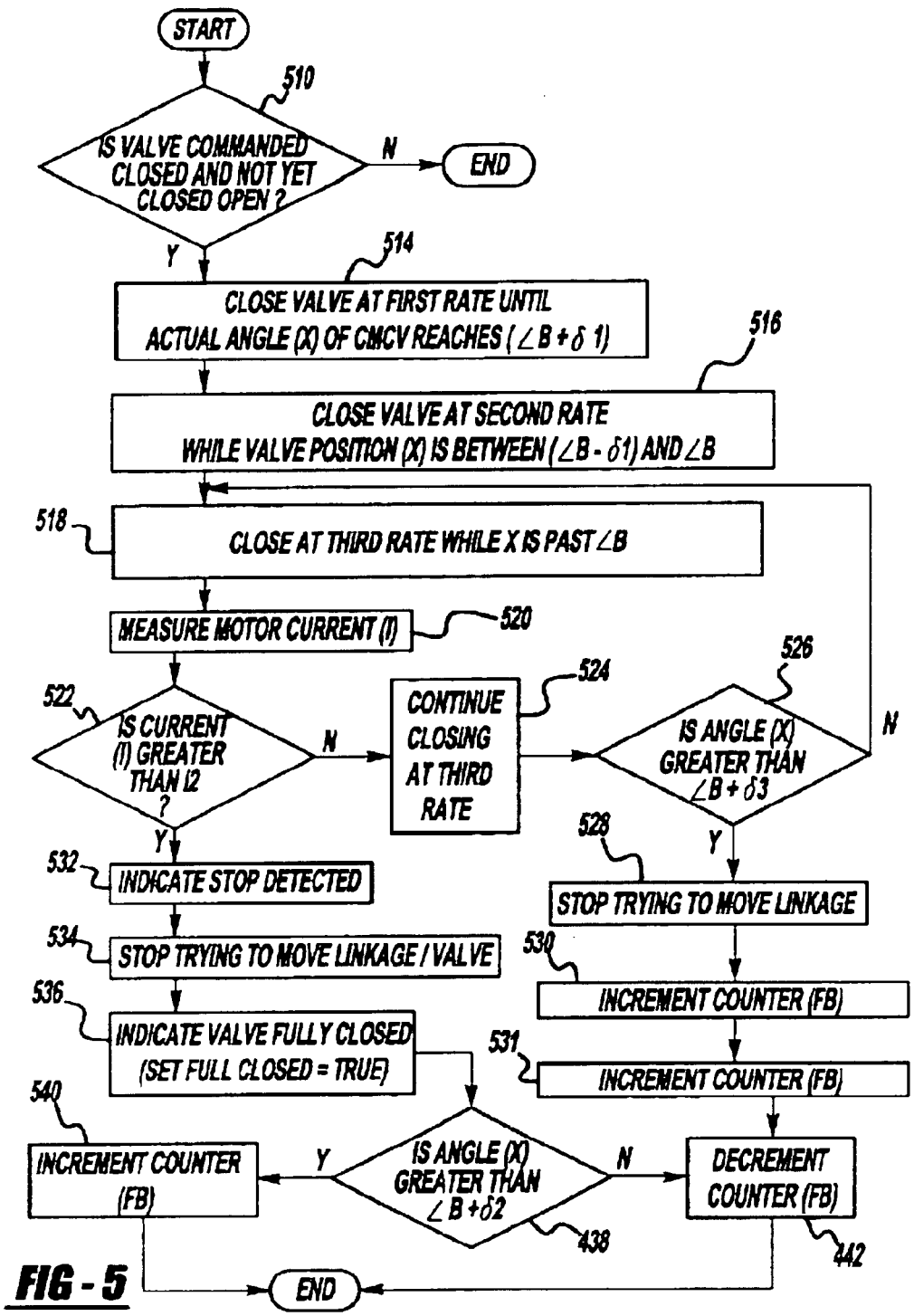

Referring now to FIG. 5, a routine for determining degradation in the second linkage is described starting at step S2. First, in step 510, the routine determines whether the valve was commanded closed and not yet fully closed. When the answer to step 510 is "no", the routine ends. Alternatively, when the answer to step 410 is "yes", the routine continues to step 514.

In step 514, the routine closes valves 216 and 236 (or a single valve in the example of an I-4 engine) at a first closing rate (CR-1), which is greater than a given closing rate CR1, until the actual angle of the motor (X) reaches a predetermined angle (angle B+X). In other words, the routine closes the first valve at a rate of speed (CR-1) greater than a predetermined value CR1. The valves are closed at this rate until the actual angle of the valves reaches a predetermined angle. In this example, the angle of the charge motion control valve 216 and 236 are determined from the angle X of the motor 200. In other words, the routine uses a predetermined mapped relationship between the motor angle and valve angle via the linkages. In an alternative embodiment, actual angle of the valves can be measured in lieu of the motor position/angle (X).

Then, in step 516, the routine closes the valves 216 and 236 at a second closing rate (CR-2) which is less than rate CR1 and greater than rate CR2 while the valve position/angle (X) is between (angle B+δ1) and angle B. Then, in step 518, the routine tries to close the valve at a third closing rate, CR-3, which is less than CR2, (where CR2 is less than CR1) while the motor position (X) is past angle B.

In other words, the routine attempts to rapidly move the charge motion control valves to the desired fully closed position, and once the valves are near the stop B, the routine moves the charge motion control valves at a slower rate. To find the stop, the routine then moves the charge motion control valves at a third slower rate (CR-3). Note that this is just one example embodiment, and if desired, a single rate, or a continuously variable rate can be used. Note that angle B refers to the motor angle at which the linkages should encounter and abut stop B. δ1 is a small margin angle. Values for δ1, R1, and R2 are determined based on mechanical design specifications and engine testing. Finally, not that instead of opening very slowly past stop B while monitoring current to detect that the closing is inhibited by a stop, the routine could also detect closing by observing that the angular position feedback is not changing (or changing less than a small tolerance) while energy is applied to the motor. Note also that a different margin of error (δ) can be used for opening and closing.

As described above with regard to FIG. 2A, once the motor has turned the valves to the fully closed position, further closing of the valves should result in the linkage encountering stop B and thereby halting movement of the valve system 202. Thus, during normal operation in step 518, the linkages are abutting stop B and the motor 200 is unable to further open valves 216 and 236.

At this point, the routine measures the motor current (I) in step B20. During normal conditions, when the linkages are abutting stop B, motor current should increase beyond a threshold level (I2) as the motor is unable to rotate past the stop. In other words, when the linkages between the motor 200 and valves 216 and 236 is intact, further movement is restricted by stop B, and as the routine attempts to move the motor position in the clockwise direction, current gradually increases. In step 522, the routine determines whether the current is greater than the threshold level I2. When the answer to step 522 is "no", the routine continues closing the valves at the third rate in step 524. Then, in step 526, the routine determines whether the angle (X) is greater than angle B plus lower case δ3. δ3 is a preselected valve indicating a margin above which angular movement indicates the linkage between motor 200 and valve 216 is degraded. If the answer to step 526 is "no", the routine returns to step 518. When the answer to step 526 is "yes", the routine continues to step 528.

In step 528, the routine stops trying to move the motor and the linkage. Then, in step 530, the routine indicates the valve is fully closed. Then, in step 531, the routine increments a degradation counter (FB) indicating the linkage from motor 200 to valve 216 is degraded. Further, the routine indicates that the charge motion control valves are in the fully open position.

When the answer to step 522 is "yes", indicating that motor current has increased and the system is at the stop, the routine indicates in step 532, that the stop has been detected. Then, in step 534, the routine stops trying to move the motor and linkage. Then, in step 536, the routine indicates that the valve is set fully closed (it sets parameter full-closed equal TRUE).

Then, in step 538, the routine determines whether the angle X is greater than angle B plus δ2. δ2 is a second angle margin indicating that the linkage has moved past the position of stop B and therefore the linkage between motor 200 and valve 216 is degraded. As above with regard to δ1, note that different values for both δ2 and δ3 can be used between the opening and closing direction.

However, to prevent false readings, the routine uses a counter (FB). When the answer to step 538 is "yes", the routine increments the counter in step 540. Alternatively, when the answer to step 538 is "no", the routine decrements the counter in step 542.

In this way, it is possible to determine degradation of the linkage between motor 200 and valve 216. In an alternative embodiment which does not use measured motor current (I), the routine can determine degradation in the linkage between motor 200 and valve 216 based on simply a counter counting the number of loops where the angle of motor 200 is greater than angle B plus lower case δ4.

Note that in this example, a linkage is used between motor 200 and valve 216. In an alternative embodiment, motor 200 can be directly coupled to valve 216 without a four-bar linkage. In other words, the linkage between valve 216 and motor 200 can be simply a bolt, screws, welding, or another such connection.

Note also that controller 12 controls the valves 216 and 236 to a desired position via feedback from sensor 90. The desired position, or angle, is determined based on engine operating parameters, such engine speed, engine load, desired torque, or others. Further, the controller 12 can simply select either open or closed position as the desired position, rather than having position control throughout the range of motion of the valves.

Also, as described above, controller 12 controls the position via feedback from sensor 90. In one example, sensor 90 measures position, or angle, of motor 200. Alternatively, valve position can be directly measured.

Figure 6:
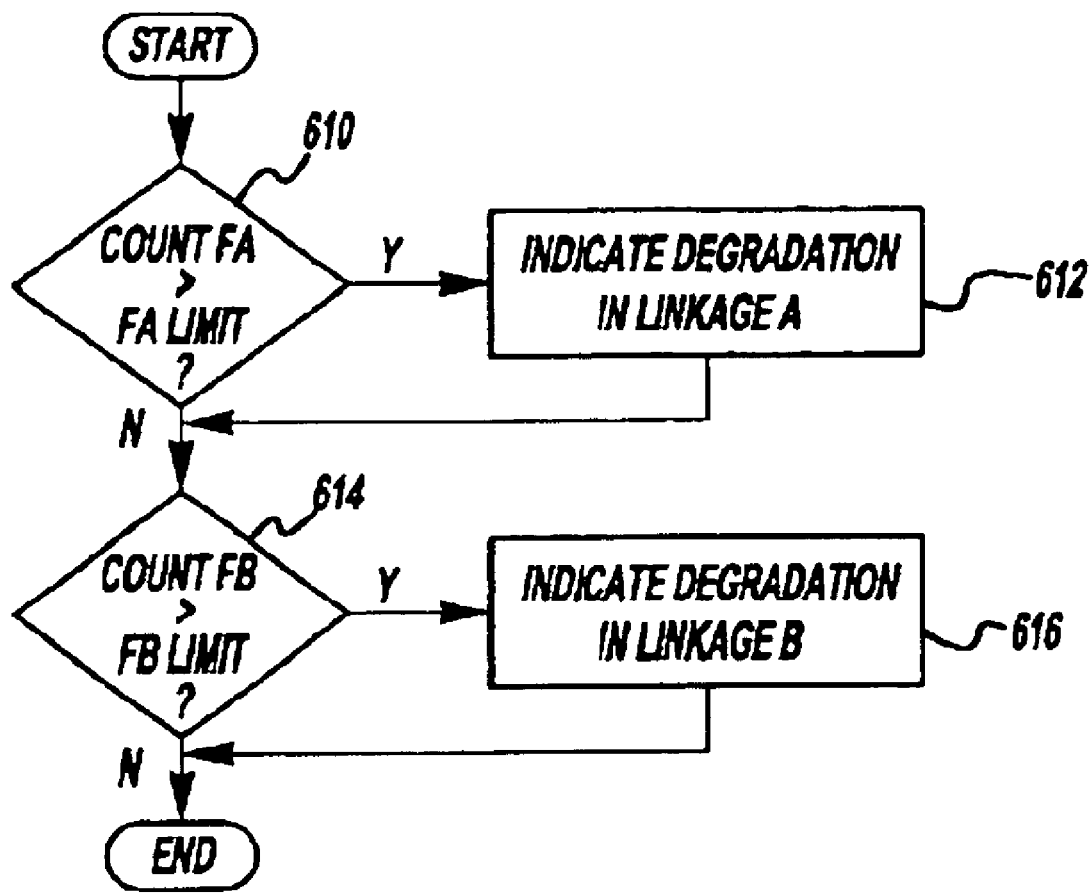

Referring now to FIG. 6, a routine is described for determining when to signal that degradation has occurred in either the first or second linkage of system 202. In step 610 of the routine, the routine checks the value (number of counts) of parameter FA as described above. If parameter FA is greater than a predetermined value (FA_Limit), then the routine performs step 612. In step 612, degradation is signaled and an indicator is set that signals the degradation has occurred. For example, this could be in the form of an indicator light being displayed on the dashboard or in a code that is set in the controller 12, then the routine performs step 614. If in step 610 the value of the parameter FA is less than a predetermined limit (FA_Limit), then the routine performs step 614. In step 614 the routine checks the value (number of counts) of parameter FB as described above. If the value of parameter FB is greater than a predetermined value (FB_Limit) then the routine performs step 616. In step 616, degradation is signaled and an indicator is set that signals the degradation has occurred. For example, this could be in the form of an indicator light being displayed on the dashboard or in a code that is set in the controller 12, then the routine ends. If in step 614 the value of parameter FB is less than a predetermined limit (FB_Limit), then the routine ends.

Figure 7:
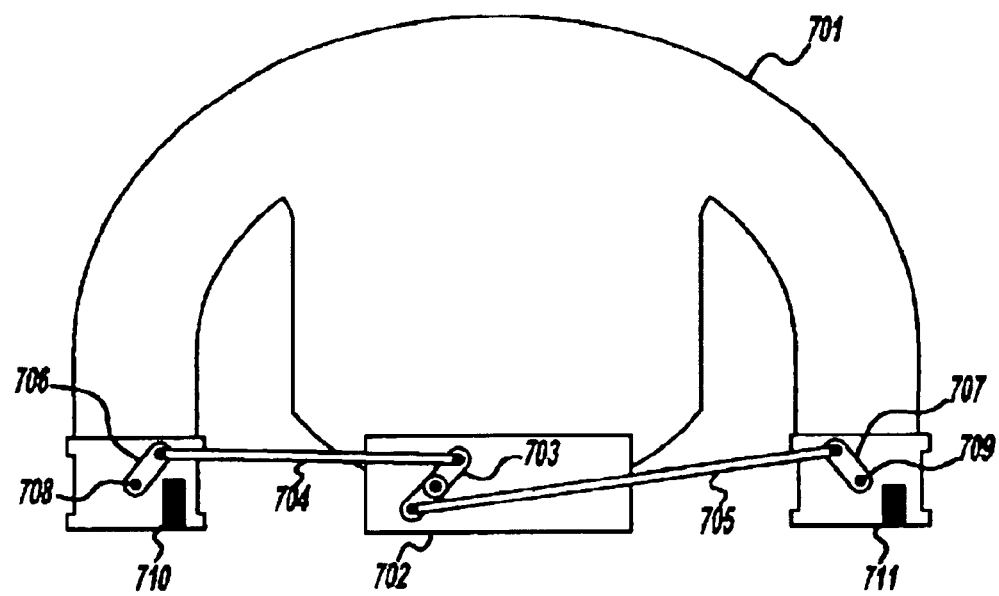
FIGS. 7–12 are detailed schematics of the valve system.

FIG. 7 shows a valve schematic of a valve system in the closed position, which is attached to intake manifold 701. It shows a valve actuation motor 702 that actuates linkage 703, which is connected to linkages 704 and 705, which are also connected to additional linkages 706 and 707 respectively. Linkages 706 and 707 are connected to valve shafts 708 and 709 respectively. Valve shafts 708 and 709 are connected to valve plates that are not shown. In this particular variation it is shown that when the valves are in the closed position the linkages 706 and 707 do not reach the hardware stops 710 or 711 respectively. An alternative design would be to have the linkage mechanism 703, 704, 706 reach the hardware stop 710 at the closed position.

Figure 8:
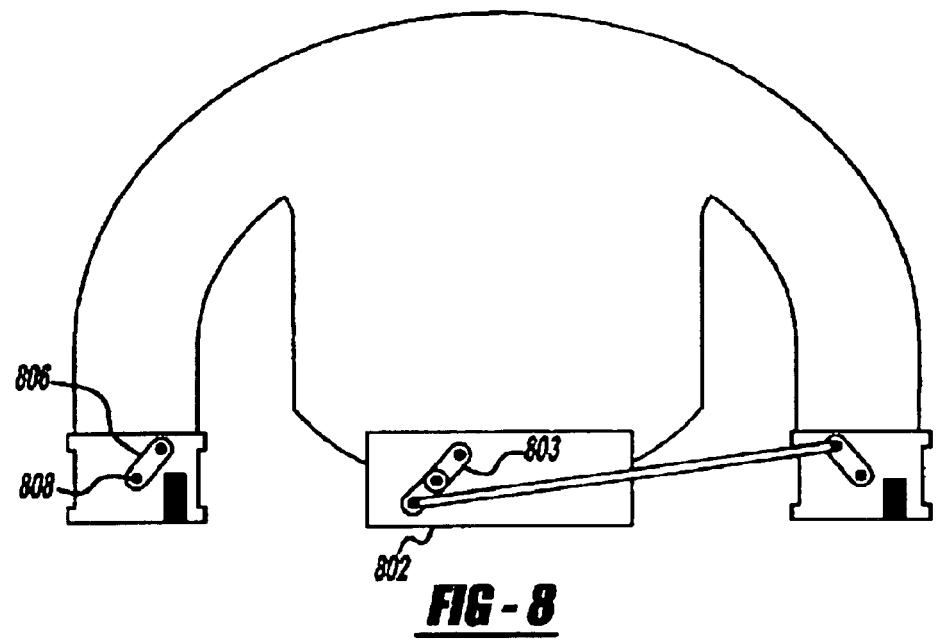

FIG. 8 shows degradation of the left hand linkage. Here the linkage between linkage 803 and 806 is not attached in the system. It could also be represented as any type of degradation where the connection between motor 802 and valve shaft 808 is disrupted or not functioning according to the original linkage geometry.

Figure 9:
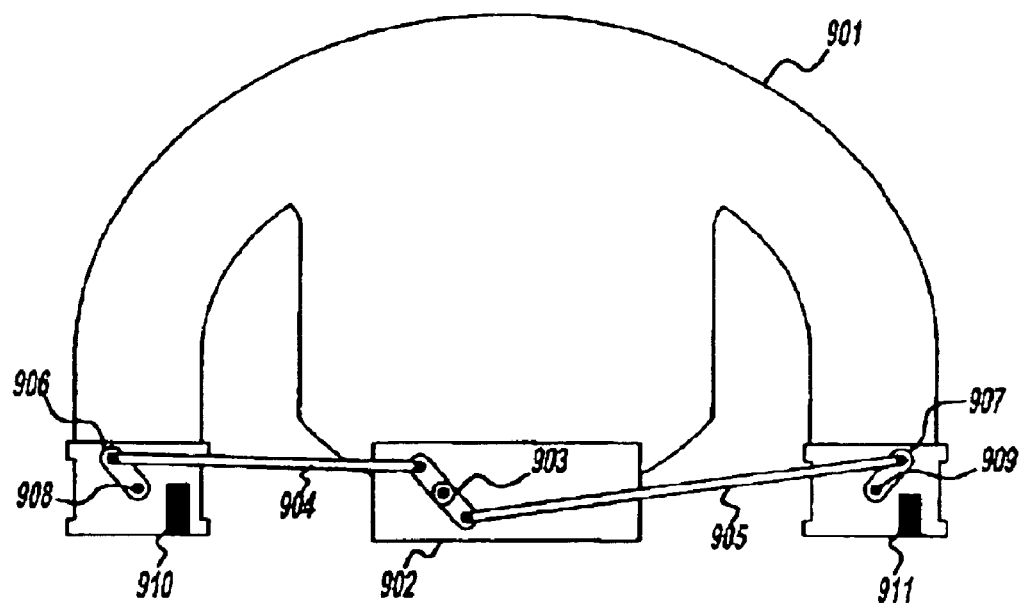

FIG. 9 shows a valve schematic of a valve system in the open position. It shows a valve actuation motor 902 that actuates linkage 903, which is connected to linkages 904 and 905, which are also connected to additional linkages 906 and 907 respectively. Linkages 906 and 907 are connected to valve shafts 908 and 909 respectively. Valve shafts 908 and 909 are connected to valve plates that are not shown. In this particular variation it is shown that when the valves are in the open position the linkages 906 and 907 do not reach the hardware stops 910 or 911 respectively. An alternative design would be to have the linkage mechanism 903, 905, 907 reach the hardware stop 911 at the open position.

Figure 10:
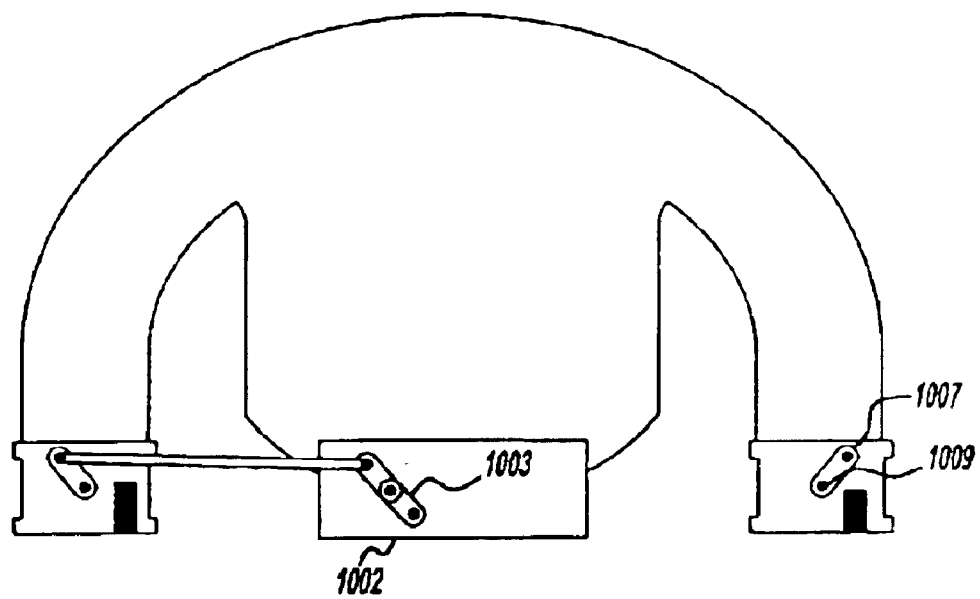

FIG. 10 shows degradation of the right hand linkage. Here the linkage between linkage 1003 and 1007 is not attached in the system. It could also be represented as any type of degradation where the connection between motor 1002 and valve shaft 1009 is disrupted or not functioning according to the original linkage geometry.

Figure 11:
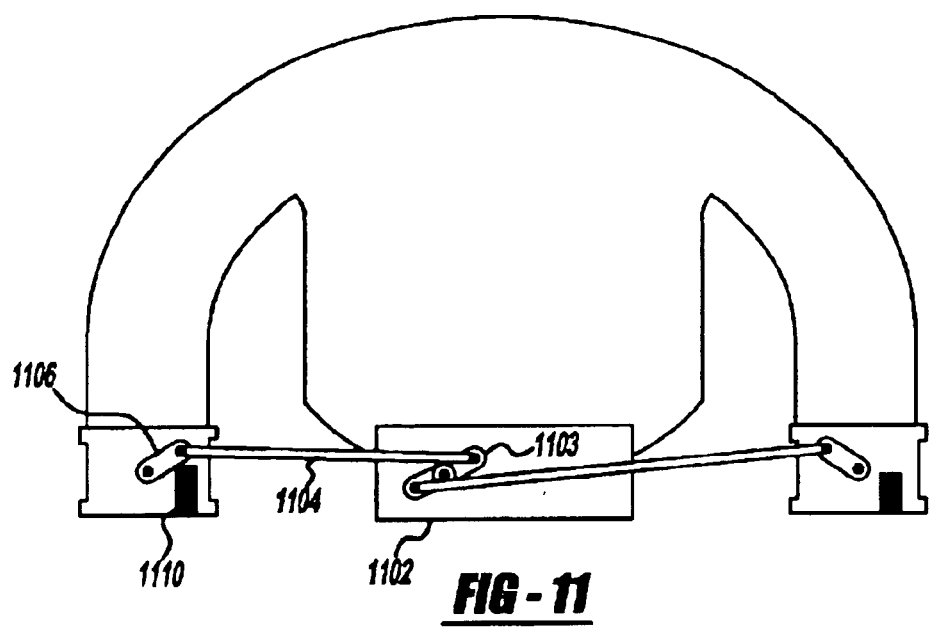

FIG. 11 shows the linkage mechanism being tested for linkage degradation by rotating linkage 1106 until it contacts hardware stop 1110. This prevents the linkage from further travel, and through the linkage system 1106, 1104 and 1103, motor 1102 is restrained from further rotation. It is this restraint of rotation that determines that the linkage mechanism has not degraded. It should be noted that the hardware stops that are shown could come in a multitude of configurations including multiple stops for each independent valve system.

Figure 12:
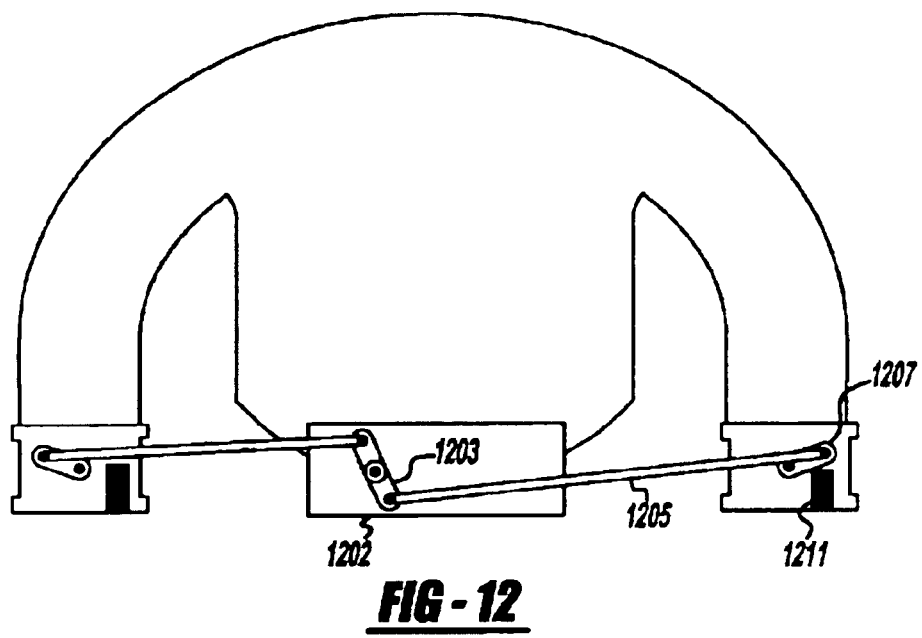

FIG. 12 shows the linkage mechanism being tested for linkage degradation by rotating linkage 1207 until it contacts hardware stop 1211. This prevents the linkage from further travel, and through the linkage system 1207, 1205 and 1203, motor 1202 is restrained from further rotation. It is this restraint of rotation that determines that the linkage mechanism has not degraded. It should be noted that the hardware stops that are shown could come in a multitude of configurations including multiple stops for each independent valve system.

As will be appreciated by one of ordinary skill in the art, the routines and Figures described above represent a pictorial of code that can be programmed into a computer such as controller 12. The flowcharts may represent one or more of any number of processing strategies such as event-driven, interrupt-driven, multi-tasking, and the like. As such, various steps or function illustrated may be performed in the sequence illustrated, in parallel, or in some cases omitted. Likewise, the order of processing is not necessarily required to achieve the features or advantages of the different embodiments of the invention, but is provided for ease of illustration, and description. Further, these Figures graphically represent code to be programmed into the computer readable storage medium in controller 12.

We claim:

1. A system for an internal combustion engine, the engine having an intake with a throttle plate located therein, the system comprising:
   a drive device;
   a valve system coupled to said drive device, said valve system coupled downstream of the throttle plate;
   a stop coming into physical contact with said valve system when said valve system approaches at least one of open and closed; and
   a controller determining degradation of said valve system if a determined valve position is past a position of said stop.

2. The system recited in claim 1 wherein determined valve position is based on an angle of said drive device.

3. The system recited in claim 1 wherein said valve system includes at least one rotatable plate.

4. The system recited in claim 1 wherein said drive system includes at least an electric motor.

5. The system recited in claim 1 wherein said stop prevents said valve system from opening greater than a predetermined amount.

6. The system recited in claim 1 wherein said stop prevents said valve system from closing greater than a predetermined amount.

7. The system recited in claim 1 wherein said valve position is a valve rotation angle.

8. A system for an internal combustion engine, comprising:
   a drive device;
   a first valve system coupled to said drive device;
   a second valve system coupled to said drive device;
   a first stop coming into physical contact with said first valve system when said first valve system approaches open; and
   a second stop coming into physical contact with said second valve system when said second valve approaches closed; and
   a controller determining degradation of said first and second valve system if a determined valve position is past a position of one of said stops.

9. The system recited in claim 8 further comprising a controller receiving a signal indicative of motor position or angle.

10. The system recited in claim 8 further comprising a controller receiving a signal indicative of motor position or angle.

11. The system recited in claim 8 further comprising a controller receiving a signal indicative of motor position or angle.

12. The system recited in claim 8 wherein said first stop comes into physical contact with said first valve system when said first valve system approaches fully open, and said second stop comes into physical contact with said second valve system when said second valve approaches fully closed.

13. A system for an internal combustion engine, comprising:
    a drive device;
    a first member coupled to said device;
    a second member coupled to said device;
    a first valve coupled to said first member;
    a second valve coupled to said second member;
    a first stop coming into physical contact with said first member when said first valve approaches fully open; and
    a second stop coming into physical contact with said second member when said second valve approaches fully closed.

14. The system recited in claim 13 wherein said first member is a first four bar linkage and said second member is a second four bar linkage.

15. A system for an internal combustion engine, comprising:
    a motor;
    a first linkage coupled to the valve;
    a second linkage coupled to the valve;
    a first valve coupled to said first linkage;
    a second valve coupled to said second linkage;
    a first stop coming into physical contact with said first linkage when said first valve approaches fully open; and
    a second stop coming into physical contact with said second linkage when said second valve approaches fully closed.

16. The system recited in claim 15 further comprising a controller receiving a signal indicative of motor position or angle.

17. The system recited in claim 15 further comprising a controller determining motor current.

18. The system recited in claim 15 further comprising a controller sending a signal to said motor.

19. The system recited in claim 15 further comprising a controller determining degradation of at least on of said first and second linkages.

20. The system recited in claim 15 further comprising a controller determining degradation of at least on of said first and second linkages based on motor position or angle, and motor current.

21. A system for an internal combustion engine, the engine having a throttle plate coupled to an intake manifold of the engine, the system comprising:
    a valve system that can move relative to a stop, said valve system located in the intake manifold of the engine downstream of the throttle plate; and
    a controller for determining a desired valve position; determining actual valve position; controlling said valve based on said actual and desired positions; and determining degradation of said valve system based on a determination of whether said actual valve position indicates said valve system has moved past said stop.

22. The system recited in claim 21 wherein the throttle plate is an electronically controlled throttle plate.

23. A system for an internal combustion engine, comprising:
- a valve system that can move relative to a stop; and
- a controller for determining a desired valve position; determining actual valve position; controlling said valve based on said actual and desired positions; and determining degradation of said valve system based on a determination of whether said actual valve position indicates said valve system has moved past said stop, wherein said valve system includes a charge motion control valve located in an intake manifold of the engine.

24. A system for an internal combustion engine, comprising:
- a valve system that can move relative to a stop; and
- a controller for determining a desired valve position; determining actual valve position; controlling said valve based on said actual and desired positions; and determining degradation of said valve system based on a determination of whether said actual valve position indicates said valve system has moved past said stop, wherein said valve system includes a swirl control valve located in an intake manifold of the engine.

25. A system for an internal combustion engine, comprising:
- a valve system that can move relative to a stop; and
- a controller for determining a desired valve position; determining actual valve position; controlling said valve based on said actual and desired positions; and determining degradation of said valve system based on a determination of whether said actual valve position indicates said valve system has moved past said stop, wherein said valve system includes a tumble control valve located in an intake manifold of the engine.

26. A system for an internal combustion engine, comprising:
- a throttle plate coupled to an intake of the engine;
- a valve system that can move relative to a stop, said valve system located in said intake downstream of said throttle plate;
- a drive device coupled to said valve;
- a controller receiving a signal indicative of electrical current in said drive device; determining a desired valve position; determining actual valve position; controlling said valve based on said actual and desired positions; and determining degradation of said valve system based on said valve position relative to said stop and said current.

27. A system comprising:
- an engine having an intake with a throttle plate located therein, said engine further having a valve coupled to an electronically driven motor located in said intake, said valve being located downstream of said throttle plate; and
- a controller for detecting operation of said valve, said controller:
  - moving the motor to a position where further movement should be restrained by a restraint in movement of the valve;
  - monitoring an electrical value corresponding to electricity utilized by the motor; and
  - in response to said monitoring, inferring whether said restraint in movement of the valve has occurred.

28. The system recited in claim 27 wherein said moving includes rotating.

29. The system recited in claim 27 wherein said moving includes moving the motor in a first direction to a first position where further movement should be restrained by said restraint in movement of the valve, and moving the motor in a second direction to a second position where further movement should be restrained by a second restraint in movement of the valve.

30. The system recited in claim 27 wherein said restraint in movement includes at a mechanical stop.

31. The system recited in claim 29 wherein said monitoring an electrical value includes monitoring motor current.

32. The system recited in claim 27 wherein said monitoring includes comparing said electrical value to a predetermined value.

33. The system recited in claim 27 wherein said inferring whether said restraint in movement of the valve has occurred includes determining whether an expected restraint in said movement has occurred.

34. The system recited in claim 27 wherein valve operation is responsive to at least one of operator demand, vehicle speed control operation, traction control operation, engine idle speed control operation, and operation of a valve adjusting airflow into a cylinder of a multi-cylinder internal combustion engine.

* * * * *